US012661704B2

(12) United States Patent
Hirata et al.

(10) Patent No.: US 12,661,704 B2
(45) Date of Patent: Jun. 23, 2026

(54) WORKPIECE TRANSPORT DEVICE

(71) Applicant: TOYOTA BOSHOKU KABUSHIKI KAISHA, Aichi-ken (JP)

(72) Inventors: Kazuyuki Hirata, Toyota (JP); Ryota Sasaki, Toyota (JP); Masashi Ohara, Nisshin (JP); Masato Yasue, Nishikasugai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 849 days.

(21) Appl. No.: 18/012,096

(22) PCT Filed: Jun. 23, 2021

(86) PCT No.: PCT/JP2021/023832
§ 371 (c)(1),
(2) Date: Dec. 21, 2022

(87) PCT Pub. No.: WO2022/004531
PCT Pub. Date: Jan. 6, 2022

(65) Prior Publication Data
US 2023/0256499 A1 Aug. 17, 2023

(30) Foreign Application Priority Data
Jun. 30, 2020 (JP) ................................ 2020-112772

(51) Int. Cl.
B21D 45/04 (2006.01)
B21D 28/02 (2006.01)
(Continued)

(52) U.S. Cl.
CPC ............. B21D 45/04 (2013.01); B21D 28/02 (2013.01); B21D 28/36 (2013.01); B65G 47/244 (2013.01)

(58) Field of Classification Search
CPC ........ B21D 45/02; B21D 45/04; B21D 45/06; B21D 45/10; B21D 45/003; B21D 28/02;
(Continued)

(56) References Cited

U.S. PATENT DOCUMENTS 3,146,571 A * 9/1964 Wood ................... A01D 78/148
56/377
3,653,293 A * 4/1972 Wallis .................... B21D 45/00
72/426
(Continued)

FOREIGN PATENT DOCUMENTS

CN 113798389 B * 11/2023 ............. B21D 28/24
DK 173529 B1 * 2/2001 ........... B26D 7/1863
(Continued)

OTHER PUBLICATIONS

CN-113798389-B english translation; Nov. 21, 2023; Yang, Ling-miao; B21D28/24.*
(Continued)

*Primary Examiner* — Laura M Lee
(74) *Attorney, Agent, or Firm* — GREENBLUM & BERNSTEIN, P.L.C.

(57) ABSTRACT

A transport device includes a moving mechanism and a plate. The moving mechanism includes a pinion, a conversion mechanism, which converts vertical motion of an upper die assembly into rotational motion of the pinion, and a rack, which is moved as the pinion rotates. The moving mechanism is configured to move, when the rack moves from the top dead center position to a bottom dead center position, the plate to a position that is away from a die apparatus in a conveying direction and is below a conveying surface. The pinion includes a toothless portion that does not mesh with the rack when the rack moves between the bottom dead (Continued)

center position and a middle position that is between the top dead center position and the bottom dead center position.

5 Claims, 9 Drawing Sheets

(51) Int. Cl.
B21D 28/36 (2006.01)
B65G 47/244 (2006.01)

(58) Field of Classification Search
CPC ... B21D 28/14; B26D 7/18–1863; B26D 7/32
See application file for complete search history.

(56) References Cited

U.S. PATENT DOCUMENTS

| | | | | |
|---|---|---|---|---|
| 3,712,107 | A | * | 1/1973 | Duhan .................... B21D 45/06 |
| | | | | 72/345 |
| 6,412,379 | B1 | * | 7/2002 | Turusaki .................. B26D 7/18 |
| | | | | 83/155.1 |
| 10,421,114 | B2 | * | 9/2019 | Hirata .................... B21D 45/10 |
| 2007/0227324 | A1 | * | 10/2007 | Baba .................... B26D 7/1818 |
| | | | | 83/37 |
| 2009/0301161 | A1 | * | 12/2009 | Fujimura ............... B21D 45/10 |
| | | | | 72/328 |
| 2017/0313015 | A1 | * | 11/2017 | Kitamura ............... B21D 45/00 |
| 2018/0361608 | A1 | * | 12/2018 | Hirata ...................... B26D 7/18 |

FOREIGN PATENT DOCUMENTS

| | | | | |
|---|---|---|---|---|
| JP | 47-35440 | | 10/1972 | |
| JP | S54-17183 | * | 2/1979 | ............ B21D 43/18 |
| JP | 59-5539 | | 1/1984 | |
| JP | S-59-225907 | * | 12/1984 | ............ B28B 11/00 |
| JP | 2019-5762 | | 1/2019 | |

OTHER PUBLICATIONS

JPS-59-225907 English translation; Dec. 19, 1984 B28B11/00.*
JPS54-17183 English translation; Feb. 3, 1979; B21D43/18.*
International Search Report issued in Japan Patent Application No. PCT/JP2021/023832, dated Sep. 7, 2021 along with an English translation thereof.

* cited by examiner

WORKPIECE TRANSPORT DEVICE

TECHNICAL FIELD

The present invention relates to a workpiece transport apparatus that transports a workpiece discharged from an upper die assembly of a die apparatus to a conveying device.

BACKGROUND ART

For example, a workpiece manufacturing apparatus disclosed in Patent Literature 1 includes a workpiece transport device.

Patent Literature 1 discloses a die apparatus including a lower die assembly and an upper die assembly, which is configured to move up and down with respect to the lower die assembly. The lower die assembly includes a punch. The punch is configured to punch out a workpiece from a metal plate, which is an unprocessed piece of material, when the upper die assembly and the lower die assembly are clamped. The upper die assembly includes an ejector. The ejector is configured to eject the workpiece, which has been punched-out and caught in the upper die assembly, downward when the die assemblies are opened.

The manufacturing apparatus includes a conveying device and an extracting device. The conveying device includes a conveying surface capable of conveying a workpiece in a horizontal direction. The extracting device, which serves as the transport device, transports the workpiece discharged from the die apparatus to the conveying device.

The extracting device includes a catch plate and a moving mechanism. The catch plate is configured to receive the workpiece at a top dead center position, which is immediately below the upper die assembly in an opened state. The moving mechanism is configured to move, as the upper die assembly moves downward, the catch plate from the top dead center position to a bottom dead center position, which is a position away from the die apparatus in the horizontal direction and is lower than the conveying surface of the conveying device.

The moving mechanism includes a gear block, a pinion, a conversion mechanism, and a rack.

The gear block is attached to the upper die assembly.

The pinion is rotatably supported by a shaft extending downward from the gear block.

The conversion mechanism is configured to convert vertical motion of the gear block into rotational motion of the pinion. The conversion mechanism includes a ball screw and a speed changing gear. The ball screw includes a screw shaft, which extends upward from the lower die assembly, and a nut fixed to the gear block. The screw shaft is screwed into the nut. The ball screw converts vertical motion of the gear block into rotational motion of the nut. The speed changing gear is drivingly coupled to the nut and meshes with the pinion to convert rotational motion of the nut into rotational motion of the pinion.

The rack is supported so as to be slidable in the horizontal direction with respect to the upper die assembly, i.e., in a direction in which the workpiece is conveyed by the conveying device. The rack meshes with the pinion and converts rotational motion of the pinion into sliding motion of the rack.

The catch plate is fixed to the rack.

CITATION LIST

Patent Literature

Patent Literature 1: Japanese Laid-Open Patent Publication No. 2019-5762

SUMMARY OF INVENTION

Technical Problem

In the workpiece extracting device described in Patent Literature 1, the rack and the catch plate fixed to the rack move obliquely downward from the top dead center position to the bottom dead center position as the upper die assembly moves downward. Therefore, it is difficult to reduce the size of the apparatus in the conveying direction of the workpiece.

Accordingly, it is an objective of the present invention to provide a workpiece transport device, the size of which can be reduced in the workpiece conveying direction.

Solution to Problem

To achieve the foregoing objective, a workpiece transport device used in a manufacturing apparatus is provided. The manufacturing apparatus includes a die apparatus and a conveying device. The die apparatus includes a lower die assembly and an upper die assembly, which is configured to be moved up and down with respect to the lower die assembly. The die apparatus is capable of punching out a workpiece from an unprocessed piece of material through cooperation of the lower die assembly and the upper die assembly, and discharging downward the punched-out workpiece, which is caught inside the upper die assembly. The conveying device includes a conveying surface capable of conveying the workpiece in a horizontal direction. The workpiece transport device is configured to transport the workpieces discharged from the upper die assembly to the conveying device. The workpiece transport device includes a moving mechanism and a plate. The moving mechanism includes a pinion, a conversion mechanism, and a rack. The pinion is provided in the upper die assembly and is supported to be rotatable about an axis extending in a vertical direction. The conversion mechanism is configured to convert vertical motion of the upper die assembly into rotational motion of the pinion. The rack is provided in the upper die assembly, is supported so as to be slidable in a conveying direction of the workpiece, and is moved in the conveying direction as the pinion rotates. The plate is coupled to the rack and is configured to receive the workpiece discharged from the upper die assembly at a receiving position immediately below the upper die assembly when the rack is located at a top dead center position. The moving mechanism is configured to move, when the rack moves from the top dead center position to a bottom dead center position, the plate from the receiving position to a position that is away from the die apparatus in the conveying direction and is below the conveying surface. The pinion includes a toothless portion that does not mesh with the rack when the rack moves between the bottom dead center position and a middle position. The middle position is between the top dead center position and the bottom dead center position.

DESCRIPTION OF EMBODIMENTS

Figure 1:
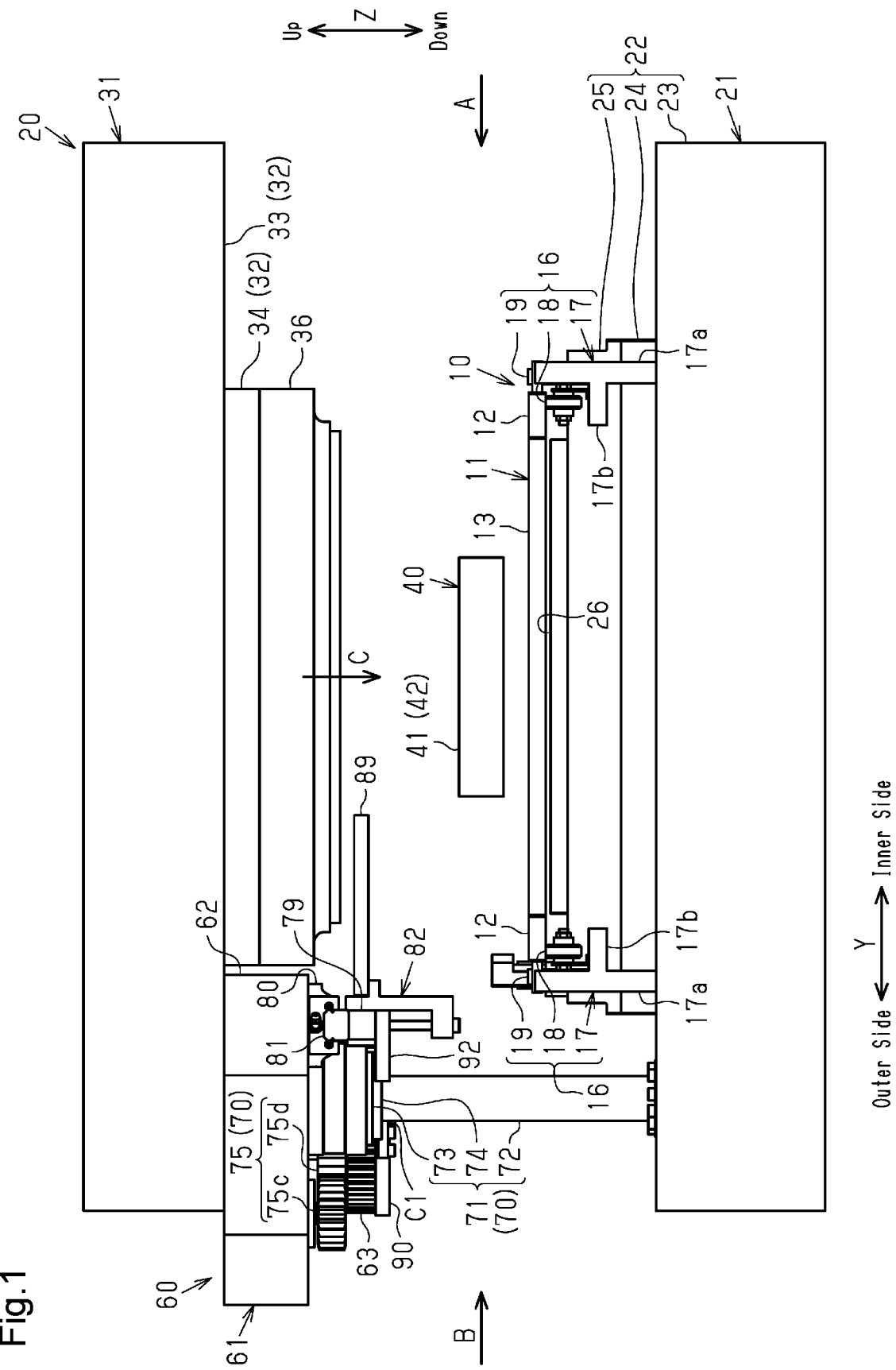
FIG. 1 is a front view showing a workpiece manufacturing apparatus in which a workpiece transfer device according to one embodiment is used.

A workpiece transport device according to one embodiment will now be described with reference to FIGS. 1 to 10B. The workpiece transport device is used in a workpiece manufacturing apparatus. The manufacturing apparatus in the present embodiment is, for example, an apparatus for manufacturing a fuel cell separator.

The terms "horizontal" and "orthogonal" are not necessarily used in a strict sense, but may be used in cases where elements are generally horizontal or generally orthogonal to each other within ranges in which such configuration achieves the operational advantages of the present embodiment.

As shown in FIGS. 1 to 4, the manufacturing apparatus includes a jig conveying apparatus 10, a die apparatus 20, a conveying device 40, and a transport device 60. The jig conveying apparatus 10 is configured to convey jigs 11. Unprocessed pieces P of material, which are sheet metal plates, are placed on the jigs 11. The die apparatus 20 is configured to punch out workpieces W from the unprocessed piece P conveyed by the jig conveying apparatus 10. The conveying device 40 is configured to convey the workpieces W. The transport device 60 is configured to transport the workpieces W discharged from the die apparatus 20 to the conveying device 40.

<Die Apparatus 20>

Figure 2:
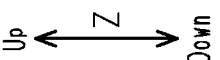
FIG. 2 is a side view of the manufacturing apparatus as viewed in a direction of arrow A in FIG. 1.

As shown in FIGS. 1 and 2, the die apparatus 20 includes a lower die assembly 21 and an upper die assembly 31. The upper die assembly 31 is provided above the lower die assembly 21 so as to move up and down with respect to the lower die assembly 21. Specifically, the upper die assembly 31 moves up and down in a vertical direction Z.

Figure 5:
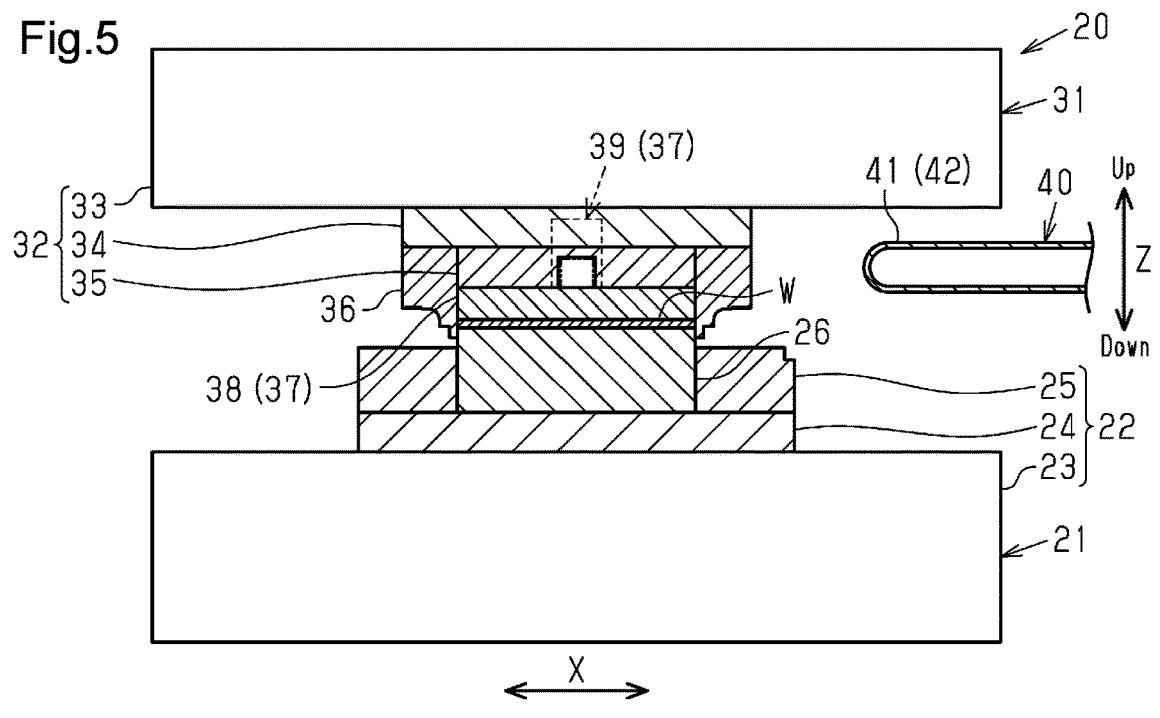
FIG. 5 is a cross-sectional view showing a state in which a die apparatus of the embodiment is clamped.
Figure 6:
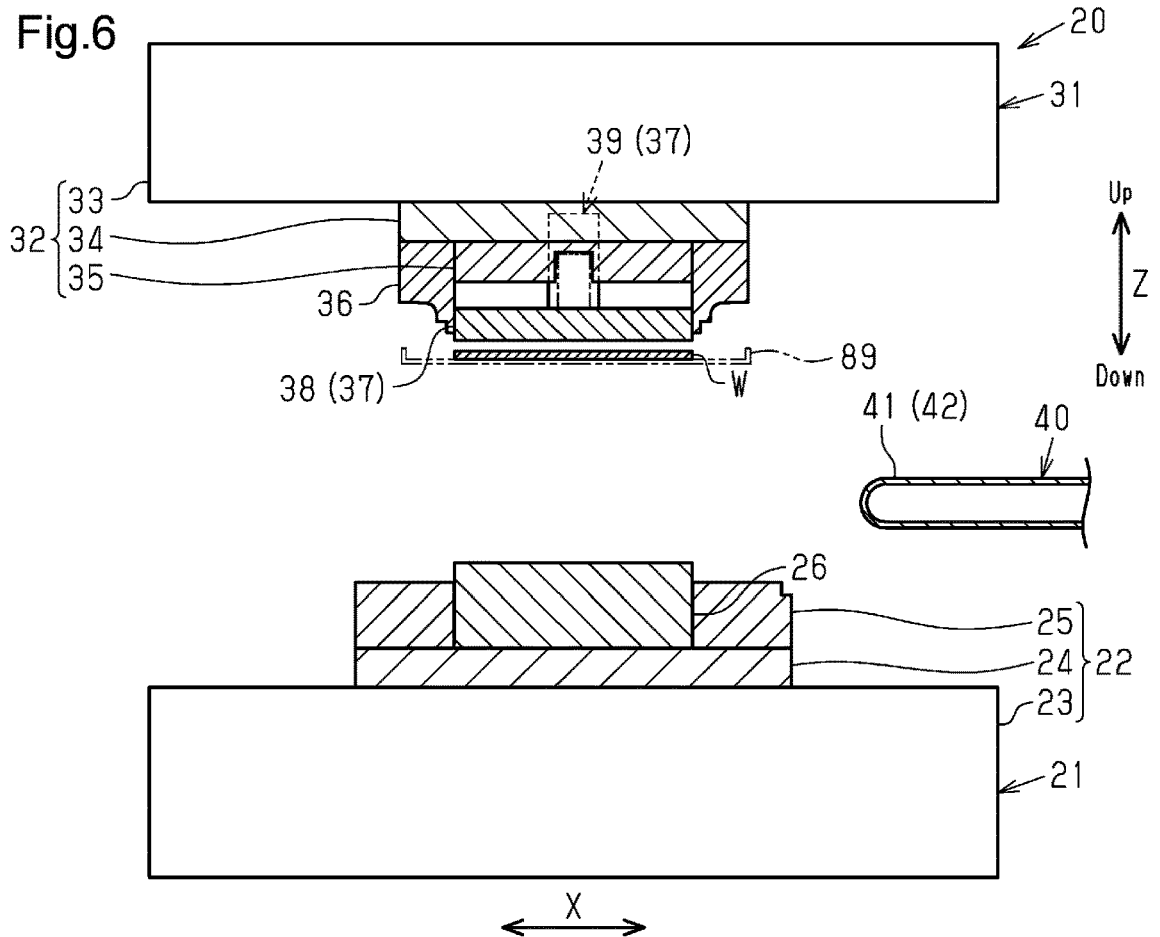
FIG. 6 is a cross-sectional view showing a state in which the die apparatus of the embodiment is opened.

As shown in FIGS. 5 and 6, the lower die assembly 21 includes a lower die body 22 and a punch 26.

The lower die body 22 includes a lower shoe 23, a base plate 24 fixed to the upper surface of the lower shoe 23, and a rectangular frame-shaped holding plate 25 fixed to the upper surface of the base plate 24.

The punch 26 has a rectangular parallelepiped shape and is disposed inside the holding plate 25.

The upper die assembly 31 includes an upper die body 32, a die 36, and an ejector 37.

The upper die body 32 includes an upper shoe 33, which is moved up and down in the vertical direction Z by an upper die driving device (not shown), a base plate 34 fixed to the lower surface of the upper shoe 33, and a stationary block 35 fixed to the lower surface of the base plate 34.

The die 36 includes a rectangular frame fixed to the lower surface of the base plate 34. The die 36 is provided on the outer side of the stationary block 35. The inner edge of the die 36 is located slightly outward of the outer edge of the punch 26.

The ejector 37 includes a rectangular plate-shaped ejector plate 38, which is located on the inner side of the die 36 and below the stationary block 35, and a drive mechanism 39, which couples the ejector plate 38 to the upper die body 32 so that the ejector plate 38 can be moved up and down relative to the ejector plate 38.

As shown in FIG. 5, in the die apparatus 20, when the upper die assembly 31 is lowered to close the lower die assembly 21 and the upper die assembly 31, the lower die assembly 21 and the upper die assembly 31 cooperate with each other. More specifically, the punch 26 and the die 36 cooperate with each other to punch out a workpiece W from the unprocessed piece P. At this time, the punched-out workpiece W is caught inside the die 36.

As shown in FIG. 6, when the upper die assembly 31 is raised to open the die apparatus 20, the ejector plate 38 is moved downward by the drive mechanism 39, so that the workpiece W caught inside the upper die assembly 31 is discharged below the die 36.

<Jig Conveying Apparatus 10>

As shown in FIGS. 1 to 4, the jig conveying apparatus 10 includes jigs 11, a support mechanism 16, and a driving device (not shown). An unprocessed piece P having the shape of a rectangular plate is placed on each jig 11 in a state in which the edges of the unprocessed piece P are positioned. The support mechanism 16 supports the jigs 11 arranged next to each other in line in a conveying direction X, which is a horizontal direction, such that the jigs 11 can be moved in the conveying direction X. The driving device (not shown) collectively and intermittently moves the jigs 11. In the following description, a direction orthogonal to both the vertical direction Z and the conveying direction X will be referred to as a width direction Y.

Figure 4:
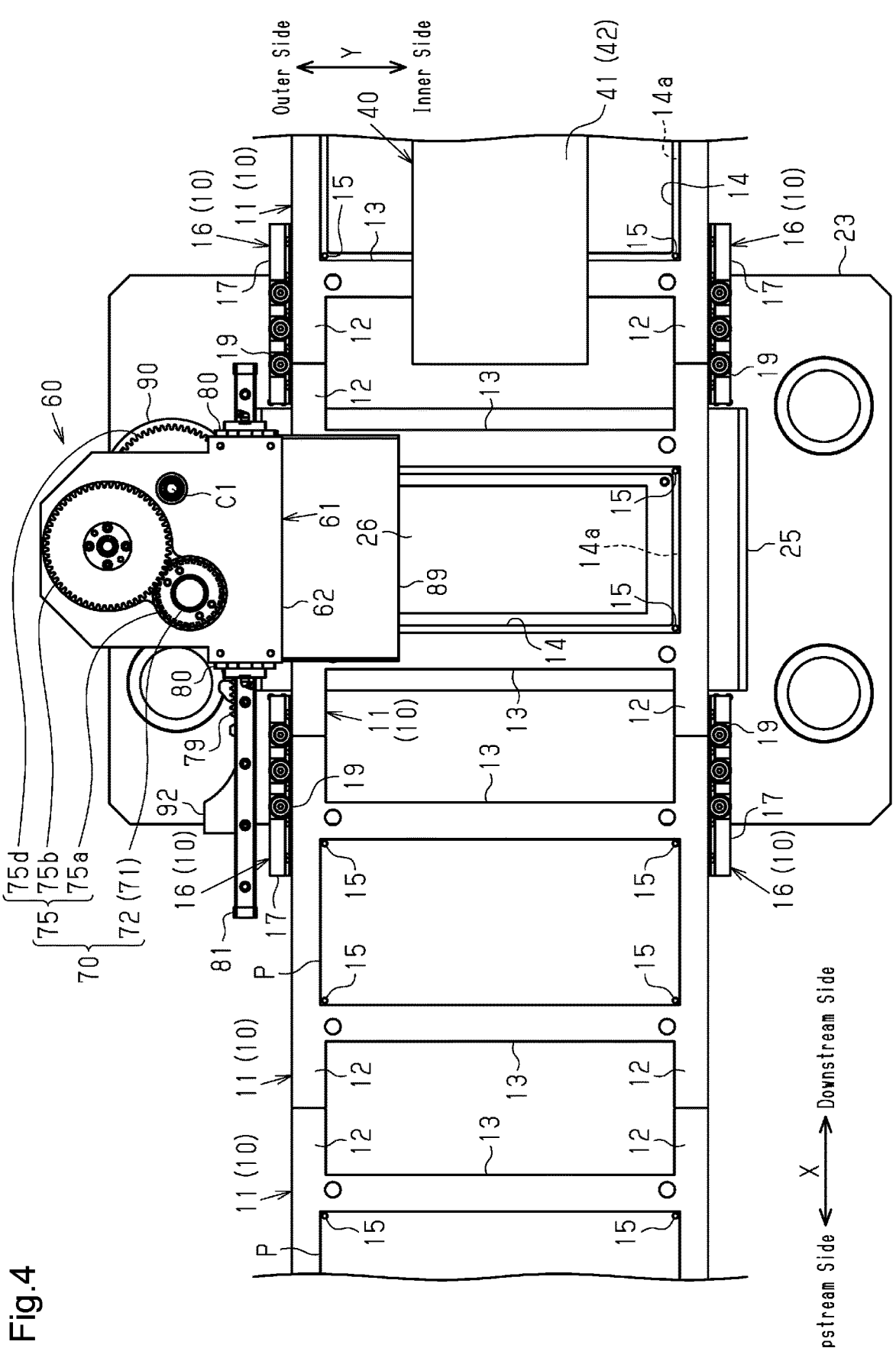
FIG. 4 is a plan view of the manufacturing apparatus as viewed in a direction of arrow C in FIG. 1.

As shown in FIG. 4, each jig 11 includes two extending portions 12 and two coupling portions 13. The extending portions 12 extend in the conveying direction X and are spaced apart from each other in the width direction Y. The coupling portions 13 extend in the width direction Y while being spaced apart from each other in the conveying direction X, and couple the extending portions 12 to each other. Each extending portion 12 projects toward the upstream side and the downstream side in the conveying direction X with respect to each coupling portion 13.

The two extending portions 12 and the two coupling portions 13 form a rectangular opening 14. The unprocessed piece P is placed on an upper periphery 14*a* of the opening 14. The upper periphery 14*a* includes holes at the four corners. These holes receive positioning pins 15, which are inserted into holes at the four corners of the unprocessed piece P. That is, the unprocessed piece P is positioned with respect to the jig 11 using the positioning pins 15.

In a state in which a jig 11 is conveyed to a position immediately above the punch 26, the inner edge of the opening 14 of the jig 11 is positioned on the outer side of the outer edge of the punch 26. In this state, the jig 11 is located above the upper surface of the punch 26 (see FIGS. 1 to 3).

In the following description, a side closer to the center of the jig 11 in the width direction Y will be referred to as an inner side in the width direction Y, and a side away from the center of the jig 11 in the width direction Y will be referred to as an outer side in the width direction Y.

Figure 7:
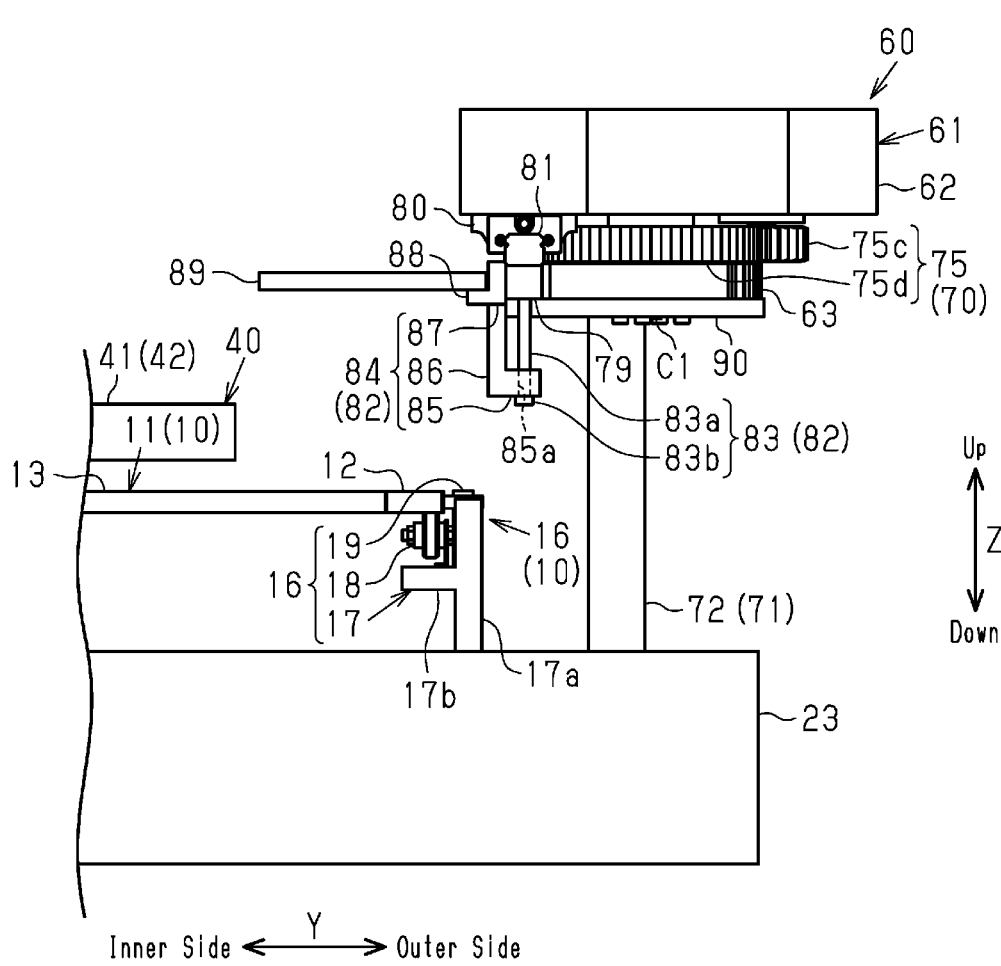
FIG. 7 is a rear view mainly showing a moving mechanism and a pinion in the manufacturing apparatus of the embodiment.

As shown in FIGS. 1, 4, and 7, the support mechanism 16 includes support blocks 17 fixed to the upper surface of the lower shoe 23, and cam followers 18,19 fixed to the support blocks 17. The illustration of the support mechanism 16 is omitted in FIGS. 2 and 3.

In the present embodiment, two pairs of support blocks 17 are provided.

One of the two pairs of the support blocks 17 is disposed upstream of the base plate 24 and the holding plate 25 in the conveying direction X. The support blocks 17 are respectively disposed on the outer side the two extending portions 12 of the jig 11 in the width direction Y.

The other pair of the support blocks 17 is disposed downstream of the base plate 24 and the holding plate 25 in the conveying direction X. The support blocks 17 are respectively disposed on the outer side the two extending portions 12 of the jig 11 in the width direction Y.

Each of the support blocks 17 includes a plate-shaped block body 17*a* and a protrusion 17*b*. The block body 17*a* is provided upright on the upper surface of the lower shoe 23 and extends in the conveying direction X. The protrusion 17*b* protrudes inward in the width direction Y from the block body 17*a*.

As shown in FIG. 1, the cam followers 18, which support the lower surfaces of the extending portions 12, are provided on the upper surfaces of the protrusions 17*b*. Each support block 17 is provided with multiple cam followers 18 arranged next to each other in the conveying direction X.

As shown in FIG. 4, the cam followers 19, which support the outer surfaces of the extending portions 12 in the width direction Y, are provided on the upper surfaces of the block bodies 17*a*. Each support block 17 is provided with multiple (three in the present embodiment) cam followers 19 arranged next to each other in the conveying direction X.

<Conveying Device 40>

As shown in FIGS. 1 to 4, the conveying device 40 includes a conveying surface 41, which is capable of conveying the workpiece W away from the die apparatus 20 in the conveying direction X.

The conveying device 40 is disposed on the downstream side of the die apparatus 20 in the conveying direction X.

The conveying surface 41 is located above the jigs 11 on the jig conveying apparatus 10.

The conveying device 40 of the present embodiment is a belt conveyor that includes an endless belt 42 having the conveying surface 41.

<Transport Device 60>

As shown in FIGS. 1 and 2, the transport device 60 includes a moving mechanism 61, a coupling mechanism 82, and a plate 89.

Figure 3:
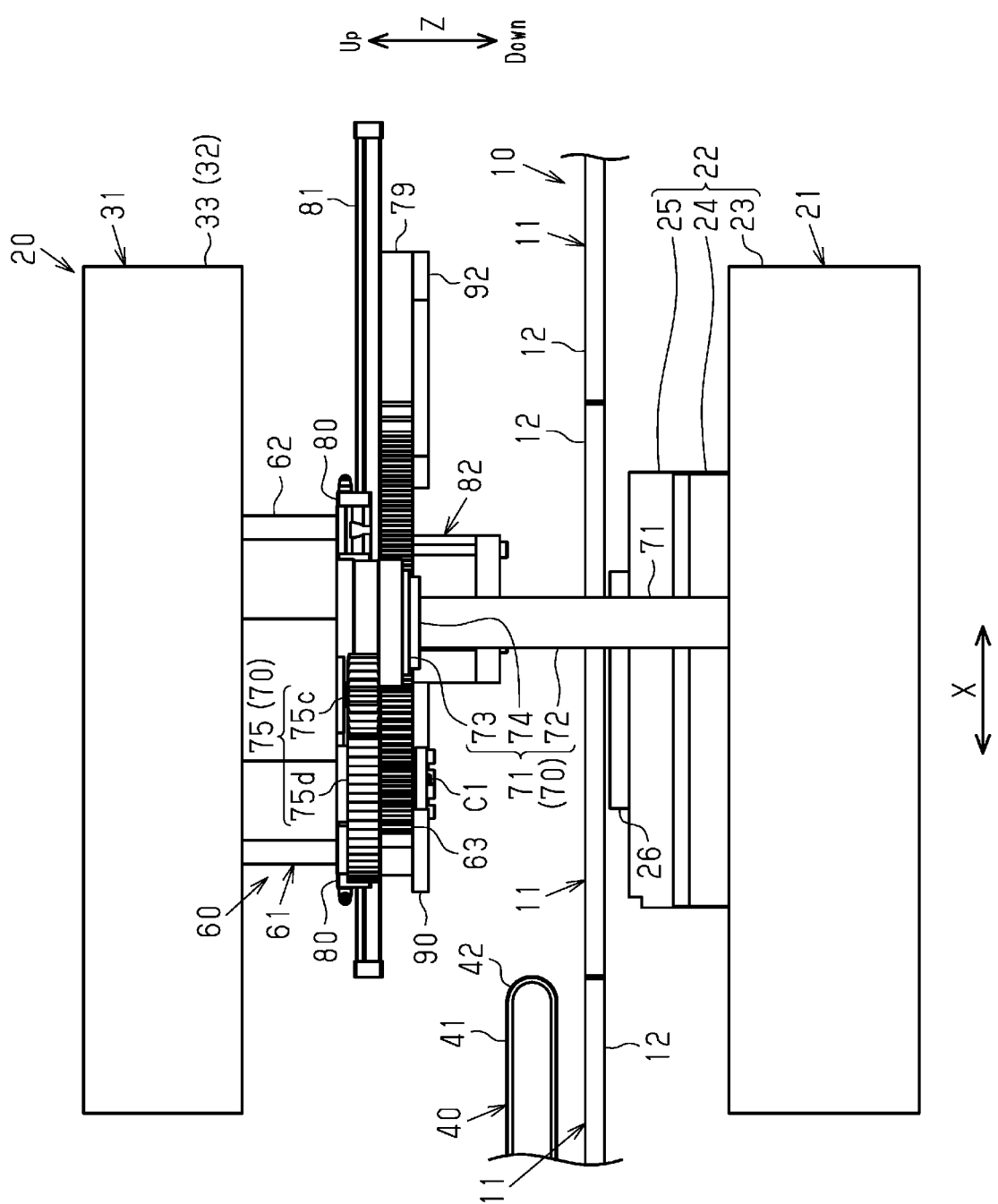
FIG. 3 is a side view of the manufacturing apparatus as viewed in a direction of arrow B in FIG. 1.

As shown in FIGS. 1, 3, and 4, the moving mechanism 61 includes a gear block 62, a pinion 63, a conversion mechanism 70, and a rack 79.

As shown in FIG. 1, the gear block 62 is fixed to the lower surface of the upper shoe 33 at a position adjacent to and on the outer side of the base plate 34 and the die 36 in the width direction Y.

The pinion 63 is supported on the lower surface of the gear block 62 so as to be rotatable about an axis Cl extending in the vertical direction Z. The pinion 63 includes teeth 63*a* on the outer circumferential surface (refer to FIGS. 9A to 9C).

As shown in FIGS. 1 and 3, the conversion mechanism 70 is configured to convert vertical motion of the gear block 62, which accompanies vertical motion of the upper die assembly 31, into rotational motion of the pinion 63.

Specifically, the conversion mechanism 70 includes a ball screw 71 and a speed changing gear train 75.

The ball screw 71 includes a screw shaft 72, which extends upward from the lower shoe 23, a sleeve 73, which is fixed to the gear block 62, and a nut 74, which is rotatably inserted into the sleeve 73. The screw shaft 72 is threaded into the nut 74.

The ball screw 71 converts vertical motion of the gear block 62 into rotational motion of the nut 74.

The gear block 62 and the upper shoe 33 include holes (not shown) through which the screw shaft 72 extends. The gear block 62 and the upper shoe 33 are thus configured to accommodate the screw shaft 72 when the upper die assembly 31 moves up and down.

As shown in FIGS. 3 and 4, the speed changing gear train 75 converts rotational motion of the nut 74 into rotational motion of the pinion 63, and includes gears 75*a* to 75*d* that mesh with each other.

Specifically, the speed changing gear train 75 includes a first gear 75*a*, which is coupled to the upper surface of the nut 74, a second gear 75*b*, which meshes with the first gear 75*a*, a third gear 75*c*, which coaxially and integrally rotates with the second gear 75*b*, and a fourth gear 75*d*, which meshes with the third gear 75*c*. The first gear 75*a* and the second gear 75*b* are both housed inside the gear block 62. The third gear 75*c* and the fourth gear 75*d* are both provided below the gear block 62. The fourth gear 75*d* rotates coaxially and integrally with the pinion 63.

As shown in FIGS. 2 and 3, the rack 79 is supported so as to be movable in the conveying direction X with respect to the upper die assembly 31. The rack 79 includes teeth 79*a*, which mesh with the teeth 63*a* of the pinion 63 (see FIGS. 9A to 9C).

Two guide members 80 are fixed to the lower surface of the gear block 62. The guide members 80 are spaced apart from each other in the conveying direction X.

The guide members 80 support a rack supporting member 81 located below the guide members 80 so as to allow the rack supporting member 81 to move in the conveying direction X.

The rack supporting member 81 extends in the conveying direction X.

The rack 79 is coupled to the lower surface of the rack supporting member 81. The rack 79 moves in the conveying direction X integrally with the rack supporting member 81 in conjunction with rotational motion of the pinion 63.

As shown in FIGS. 1 to 3, the plate 89 is coupled to the rack 79 with the coupling mechanism 82.

As shown in FIG. 7, the coupling mechanism 82 includes coupling shafts 83 and a coupling member 84, into which the coupling shafts 83 are passed.

Each coupling shaft 83 includes a shaft portion 83a, which protrudes downward from the lower surface of the rack 79, and a restriction portion 83b, which is provided at the lower end of the shaft portion 83a and has a larger diameter than the shaft portion 83a.

In the present embodiment, two coupling shafts 83 are provided that are spaced apart from each other in the conveying direction X.

The coupling member 84 includes a base portion 85, an upright wall portion 86, and an extension 87. The base portion 85 includes insertion holes 85a, into which the shaft portions 83a of the coupling shafts 83 are inserted. The upright wall portion 86 extends upward from the inner side of the base portion 85 in the width direction Y. The extension 87 extends from the upper end of the upright wall portion 86 toward the downstream side in the conveying direction X.

The coupling member 84 is restricted from moving downward by the lower surface of the base portion 85 abutting the upper surface of the restriction portion 83b of the coupling shaft 83.

The upright wall portion 86 and the extension 87 are provided with a receiving portion 88, which protrudes inward in the width direction Y. The receiving portion 88 protrudes from the lower end of the extension 87. The receiving portion 88 is provided over the entirety of the upright wall portion 86 and the extension 87 in the conveying direction X.

The end on the outer side in the width direction Y of the plate 89, which has a rectangular shape in plan view, is coupled to the upper surface of the receiving portion 88.

As shown in FIG. 7, the receiving portion 88 overlaps with the upper surface of the block body 17a of the support block 17 in the width direction Y.

The plate 89 and the endless belt 42 are spaced apart from each other in the width direction Y.

Figure 8A:
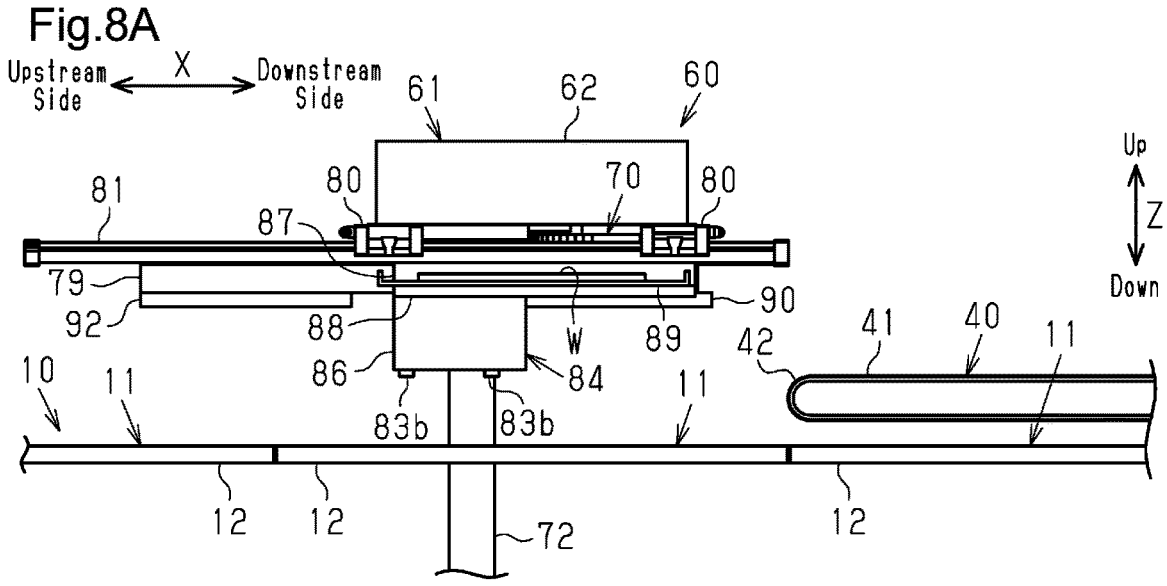
FIG. 8A is a side view showing the moving mechanism of the embodiment when a rack is located at a top dead center position.

As shown in FIG. 8A, the rack 79 is located at a top dead center position, which is the uppermost position, in a state in which the upper die assembly 31 is opened.

Figure 8B:
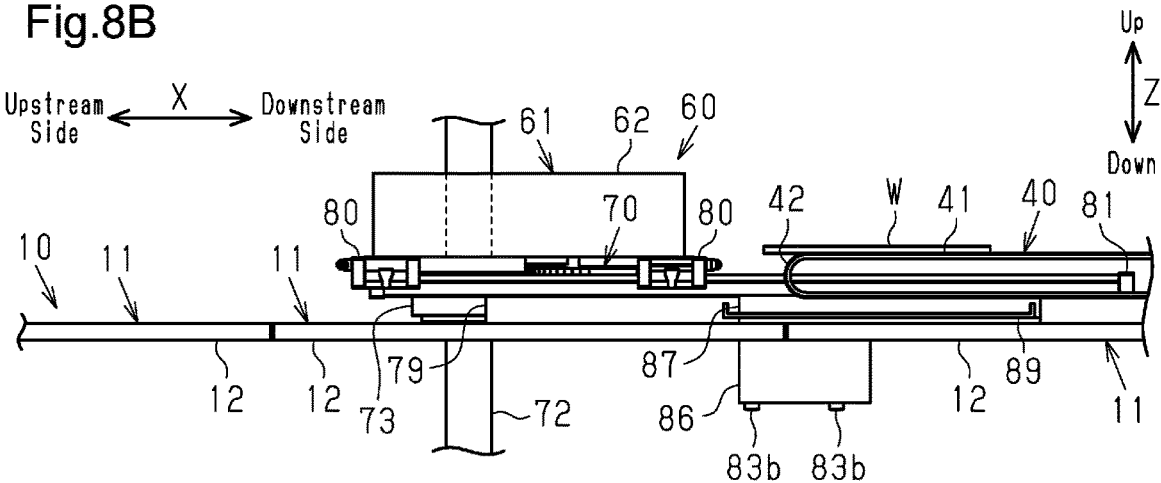
FIG. 8B is a side view showing the moving mechanism of the embodiment when the rack is located at a middle position.
Figure 8C:
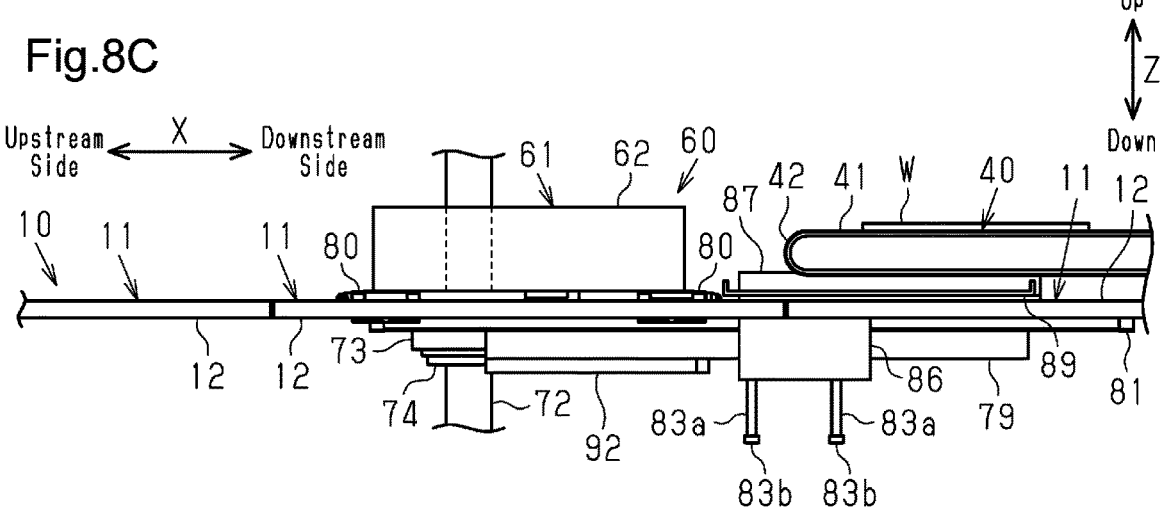
FIG. 8C is a side view showing the moving mechanism of the embodiment when the rack is located at a bottom dead center position.

As shown in FIG. 8C, the rack 79 is located at a bottom dead center position, which is the lowermost position, in a state in which the upper die assembly 31 is closed.

When the rack 79 is at the top dead center position as shown in FIG. 8A, the plate 89 is located at a receiving position, which is immediately below the upper die assembly 31. Thus, the plate 89 receives the workpiece W that is discharged from the upper die assembly 31 by the ejector 37.

When the rack 79 moves between the top dead center position and the bottom dead center position as shown in FIGS. 8A to 8C, the conversion mechanism 70 converts vertical motion of the upper die assembly 31 into rotational motion of the pinion 63. As the pinion 63 rotates, the rack 79 is moved in the conveying direction X. As a result, the plate 89 moves between the receiving position and a position that is separated from the die apparatus 20 in the conveying direction X and is below the conveying surface 41.

Figure 9A:
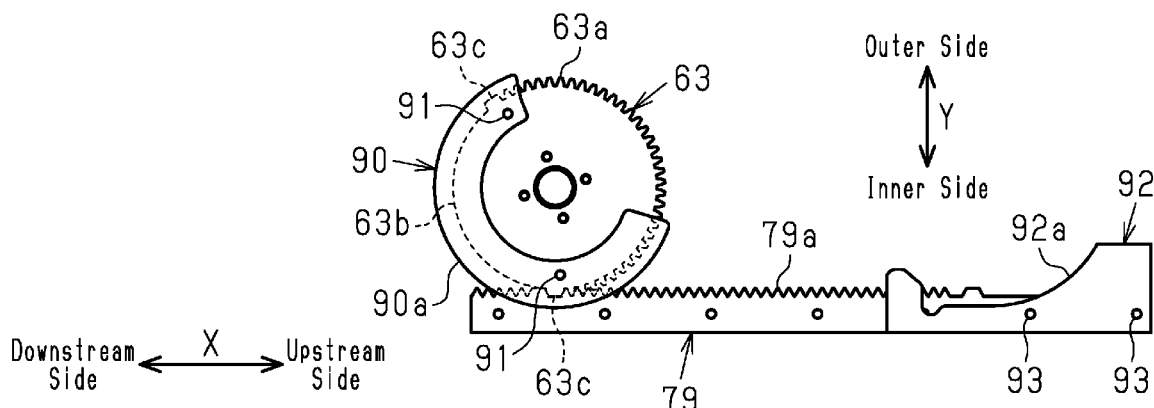
FIG. 9A is a bottom view mainly showing the pinion and the rack of the embodiment when the rack is located at the top dead center position.
Figure 9B:
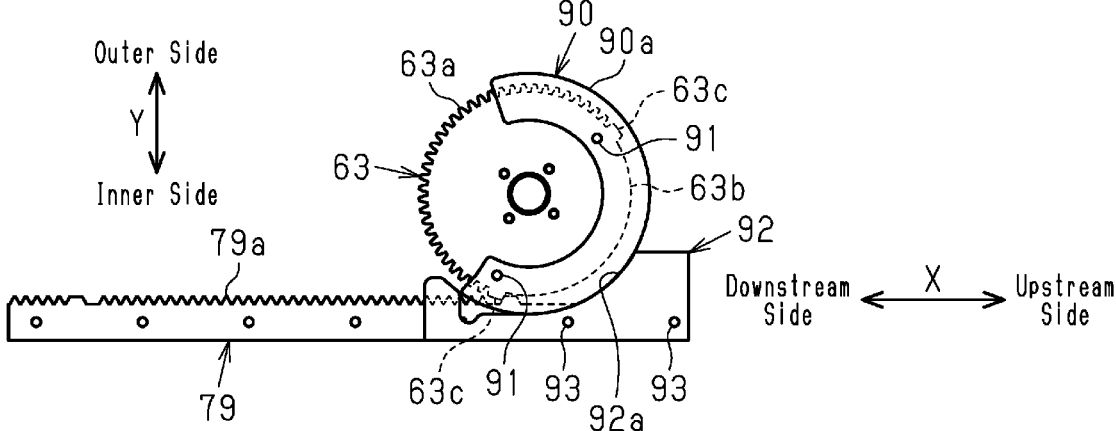
FIG. 9B is a bottom view mainly showing the pinion and the rack of the embodiment when the rack is located at the middle position.
Figure 9C:
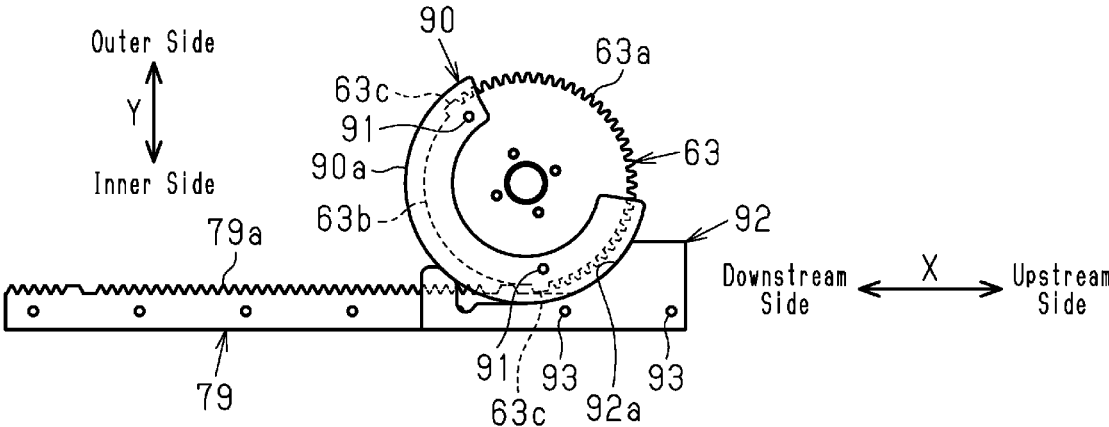
FIG. 9C is a bottom view mainly showing the pinion and the rack of the embodiment when the rack is located at the bottom dead center position.

As shown in FIGS. 9A to 9C, the pinion 63 includes a toothless portion 63b, which does not mesh with the rack 79 when the rack 79 moves between the bottom dead center position and a middle position, which is between the top dead center position and the bottom dead center position.

The teeth 63a of the pinion 63 include large teeth 63c at the opposite ends in the circumferential direction of the pinion 63. The large teeth 63c are wider in the circumferential direction than the other teeth 63a.

When the rack 79 moves between the top dead center position and the middle position, the rack 79 is positioned closer to the downstream end in the conveying direction X as its position approaches the lower end as shown in FIGS. 8A and 8B.

When the rack 79 moves between the middle position and the bottom dead center position, the rack 79 moves in the vertical direction Z as shown in FIGS. 8B and 8C.

In the present embodiment, the middle position corresponds to a first middle position and a second middle position according to the present invention. That is, the present embodiment corresponds to an example in which the first middle position and the second middle position according to the present invention are the same position.

When the rack 79 moves between the top dead center position and the middle position, the upper surface of the block body 17a of the support block 17 is separated from the lower surface of the receiving portion 88 of the coupling member 84 as shown in FIG. 7.

Figure 10A:
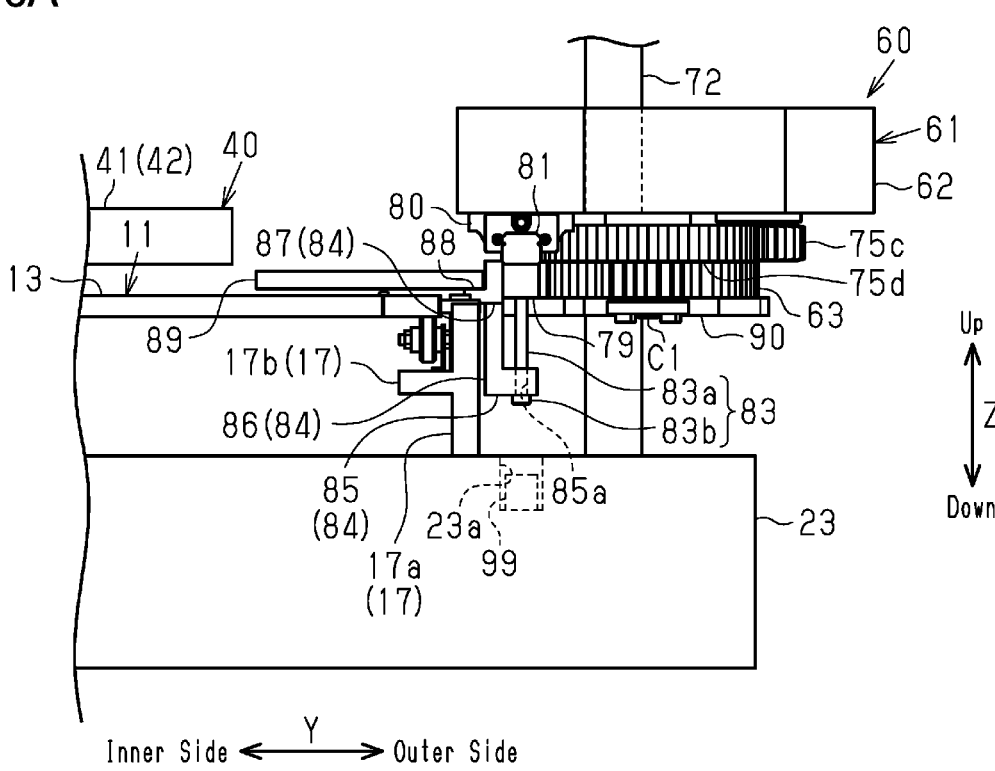
FIG. 10A is a rear view corresponding to FIG. 7, illustrating the manufacturing apparatus when the rack is at the middle position.
Figure 10B:
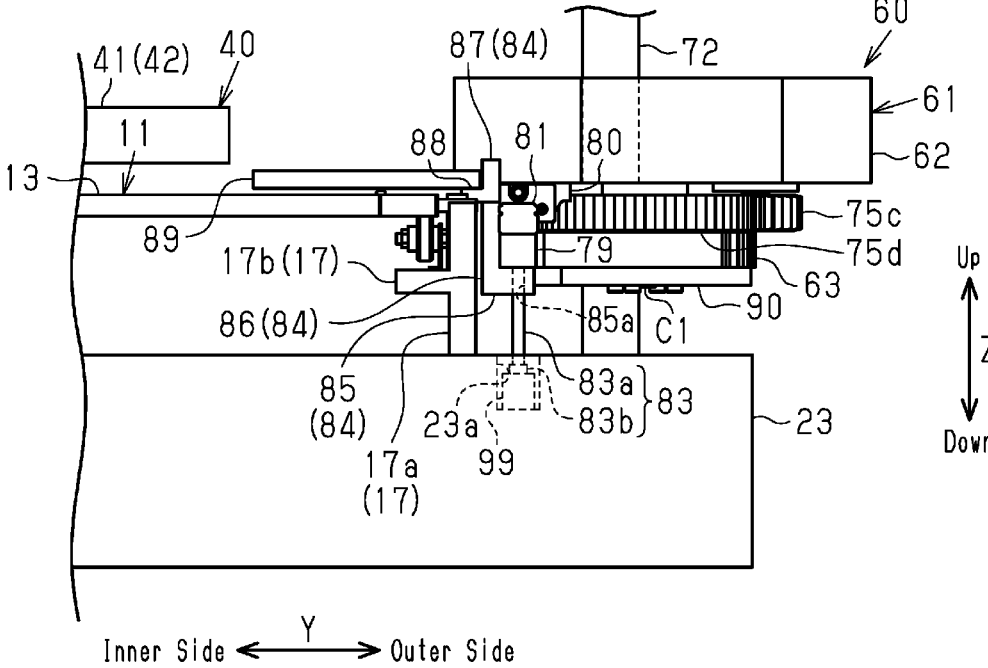
FIG. 10B is a rear view corresponding to FIG. 7, illustrating the manufacturing apparatus when the rack is at the bottom dead center position.

In contrast, when the rack 79 moves between the middle position and the bottom dead center position, the upper surface of the block body 17a comes into contact with the lower surface of the receiving portion 88 as shown in FIGS. 10A and 10B. This prevents the coupling member 84 from moving downward, while allowing the rack 79 to move downward.

A recess 23a for accommodating the coupling shaft 83 is formed in the upper surface of the lower shoe 23. The recess 23a incorporates an absorbing member 99 having a rectangular parallelepiped shape. The absorbing member 99 absorbs an impact from the restriction portion 83b of the coupling shaft 83. The absorbing member 99 is made of an elastic material such as a foamed plastic.

In the present embodiment, the support block 17 that is located between the endless belt 42 and the rack 79 in the width direction Y and located downstream of the base plate 24 and the holding plate 25 in the conveying direction X corresponds to a restricting member according to the present invention.

As shown in FIGS. 9A to 9C, an engaging member 90, which is a C-shaped plate in plan view, is coupled to the lower surface of the pinion 63 with bolts 91. The engaging member 90 includes an arcuate outer peripheral surface 90a, which extends in the circumferential direction of the pinion 63. In the present embodiment, the diameter of the engaging member 90 is larger than the diameter of the pinion 63. That is, the outer peripheral surface 90a of the engaging member 90 is located on the outer side of the outer periphery of the pinion 63.

A supporting member 92 is coupled to the lower surface of the rack 79 with bolts 93.

When the rack 79 is at the top dead center position, the supporting member 92 is located on the upstream side of the engaging member 90 in the conveying direction X.

The supporting member 92 includes an arcuate supporting surface 92a. The supporting surface 92a extends along the outer peripheral surface 90a of the engaging member 90 such that a given point on the supporting surface 92a is shifted toward the outer side in the width direction Y as that point moves toward the upstream side in the conveying direction X.

When the rack 79 moves between the middle position and the bottom dead center position, that is, when the pinion 63 does not mesh with the rack 79, the supporting surface 92a rotatably supports the engaging member 90 while sliding on the outer peripheral surface 90a of the engaging member 90.

Operation of the present embodiment will now be described.

When the upper die assembly 31 is raised to be opened, the pinion 63 is rotated in a first direction about the axis Cl, which extends in the vertical direction Z, in conjunction with the ascent of the upper die assembly 31, and the rack 79 approaches the die apparatus 20 in the conveying direction X. That is, the rack 79 moves toward the upstream side. When the rack 79 is moved to the top dead center position as shown in FIGS. 6 and 8A, the plate 89 receives the workpiece W discharged from the upper die assembly 31 at the receiving position immediately below the upper die assembly 31.

Subsequently, when the upper die assembly 31 is lowered to be closed as shown in FIG. 8B, the pinion 63 is rotated in a second direction, which is opposite to the first direction, in conjunction with the descent of the upper die assembly 31, and the rack 79 is moved away from the die apparatus 20 in the conveying direction X. That is, the rack 79 moves toward the downstream side. When the rack 79 moves from the top dead center position to the bottom dead center position, the plate 89 moves from the receiving position to a position that is away from the die apparatus 20 in the conveying direction X and is below the conveying surface 41 of the conveying device 40. At this time, the workpiece W placed on the plate 89 is transferred to the conveying device 40.

When the rack 79 moves between the bottom dead center position and the middle position, which is between the top dead center position and the bottom dead center position, the toothless portion 63b of the pinion 63 does not transmit the rotational force of the pinion 63 to the rack 79. Accordingly, the rack 79 remains unmoved in the conveying direction X as shown in FIGS. 9B and 9C. That is, as shown in FIGS. 8B and 8C, the rack 79 moves in the vertical direction Z between the middle position and the bottom dead center position, but does not move toward the downstream side in the conveying direction X, in which the workpiece W is conveyed by the conveying device 40.

The present embodiment has the following advantages.

(1) The pinion 63 includes the toothless portion 63b, which does not mesh with the rack 79 when the rack 79 moves between the bottom dead center position and the middle position (first middle position). The middle position is between the top dead center position and the bottom dead center position.

This configuration operates in the above-described manner.

It is thus possible to reduce the size of the transport device 60 in the conveying direction X of the workpiece W.

(2) The transport device 60 includes the coupling mechanism 82, which couples the plate 89 and the rack 79 to each other. The coupling mechanism 82 is configured to move the plate 89 integrally with the rack 79 when the rack 79 moves between the top dead center position and the middle position (second middle position), and to prevent the plate 89 from moving in the vertical direction Z when the rack 79 moves between the middle position (second middle position) and the bottom dead center position.

With this configuration, the plate 89 moves integrally with the rack 79 when the rack 79 moves between the top dead center position and the middle position (second middle position). Also, the plate 89 is prevented from moving in the vertical direction Z when the rack 79 moves between the middle position (second middle position) and the bottom dead center position. Since the plate 89 does not move to a position lower than the middle position (second middle position), the plate 89 is prevented from interfering with another device positioned below the middle position (second middle position). That is, the plate 89 is prevented from interring with the jig conveying apparatus 10.

(3) The coupling mechanism 82 includes the coupling member 84 and the coupling shaft 83. The coupling member 84 is coupled to one end in the width direction Y of the plate 89, and includes the insertion holes 85a, which extend through the coupling member 84 in the vertical direction Z. Each coupling shaft 83 includes the shaft portion 83a, which protrudes downward from the rack 79 and is inserted into the insertion hole 85a. Each coupling shaft 83 also includes the restriction portion 83b, which restricts downward movement of the coupling member 84 by coming into contact with the lower surface of the coupling member 84. The present embodiment includes the support blocks 17, each of which functions as a restricting member. When the rack 79 moves between the top dead center position and the middle position (second middle position), the support blocks 17 are separated from the lower surface of the coupling member 84. When the rack 79 moves between the middle position (second middle position) and the bottom dead center position, the support blocks 17 come into contact with the lower surface of the coupling member 84 to prevent the coupling member 84 from moving downward, while allowing the rack 79 to move downward.

With this configuration, when the rack 79 moves between the top dead center position and the middle position (second middle position), there is a gap between the support blocks 17, each of which functions as a restricting member provided below the coupling member 84, and the lower surface of the coupling member 84. Since the downward movement of the coupling member 84 is restricted by the restriction portions 83b of the coupling shafts 83 abutting the lower surface of the coupling member 84, the plate 89 moves integrally with the rack 79.

When the rack 79 moves between the middle position (second middle position) and the bottom dead center position, the support blocks 17, each of which functions as a restricting member, come into contact with the lower surface of the coupling member 84 so as to prevent the coupling member 84 from moving in the vertical direction Z. The movement of the shaft portions 83a of the coupling shafts 83 in the insertion holes 85a of the coupling member 84 allows the rack 79 to move in the vertical direction Z.

As described above, the coupling mechanism 82 is easily obtained by combining the coupling member 84, the coupling shafts 83, and the support blocks 17 as restricting members.

(4) The engaging member 90 is coupled to the pinion 63. The engaging member 90 includes the arcuate outer peripheral surface 90a, which extends in the circumferential direction of the pinion 63. The rack 79 includes the supporting member 92. When the pinion 63 does not mesh with the rack 79, the supporting member 92 rotatably supports the engaging member 90, while sliding on the outer peripheral surface 90a of the engaging member 90.

When the pinion 63 does not mesh with the rack 79, the rack 79 may be displaced with respect to the pinion 63.

In this regard, with the above-described configuration, when the pinion 63 does not mesh with the rack 79, the supporting member 92 in the rack 79 rotatably supports the engaging member 90 while sliding on the outer peripheral surface 90a of the engaging member 90 in the pinion 63. This prevents the rack 79 from being displaced with respect to the pinion 63.

(5) The supporting member 92 includes the arcuate supporting surface 92a, which extends along the outer peripheral surface 90a and rotatably supports the engaging member 90 while sliding on the outer peripheral surface 90a of the engaging member 90.

With this configuration, the supporting member 92 is formed easily by providing the supporting surface 92a.

(6) The teeth 63a of the pinion 63 include the large teeth 63c at the opposite ends in the circumferential direction of the pinion 63. The large teeth 63c are wider in the circumferential direction than the other teeth 63a.

The teeth of the pinion 63 that are adjacent to the toothless portion 63b in the circumferential direction receive a large load when the teeth start to mesh with the teeth 79a of the rack 79.

In this regard, the above-described configuration allows the strength of the large teeth 63c against the load to be increased.

<Modifications>

The above-described embodiments may be modified as follows. The above-described embodiment and the following modifications can be combined as long as the combined modifications remain technically consistent with each other.

The absorbing member 99 may be omitted.

The large teeth 63c may be omitted.

The diameter of the engaging member 90 may be less than or equal to the diameter of the pinion 63.

The supporting member 92 is not limited to one having the arcuate supporting surface 92a in the above-described embodiment, but may include a cam follower, for example.

The engaging member 90 and the supporting member 92 may be omitted.

The coupling mechanism 82 may be omitted, and the plate 89 may be directly or indirectly coupled to the rack 79.

The transport device 60 is not limited to one provided on one side in the width direction Y, but may be provided on either side in the width direction Y.

With this configuration, since the workpiece W is supported from both sides in the width direction Y, the workpiece W is taken out in a stable manner.

Although the first middle position and the second middle position are the same position (middle position) in the above-described embodiments, the second middle position may be a position lower than the first middle position.

What is claimed is:

1. A manufacturing apparatus, comprising:
a workpiece transport device;
a die apparatus; and
a conveying device, wherein
the die apparatus includes a lower die assembly and an upper die assembly, the upper die assembly is configured to be moved up and down with respect to the lower die assembly,
the die apparatus is configured for punching out a workpiece from an unprocessed piece of material through cooperation of the lower die assembly and the upper die assembly, and discharging downward the punched-out workpiece, caught inside the upper die assembly,
the conveying device includes a conveying surface for conveying the workpiece in a horizontal direction,
the workpiece transport device is configured to transport the workpiece discharged from the upper die assembly to the conveying device,
the workpiece transport device comprises a moving mechanism and a plate, the moving mechanism includes:
a pinion that is provided in the upper die assembly and is supported to be rotatable about an axis extending in a vertical direction;
a conversion mechanism that is configured to convert vertical motion of the upper die assembly into rotational motion of the pinion; and
a rack that is provided in the upper die assembly, is supported so as to be slidable in a conveying direction of the workpiece, and is moved in the conveying direction as the pinion rotates, the rack is configured to move vertically to a top dead center position, a middle position, and a bottom dead center position, as the upper die assembly moves up and down with respect to the lower die assembly,
the plate is coupled to the rack and is configured to receive the workpiece discharged from the upper die assembly at a receiving position immediately below the upper die assembly as the rack is located at the top dead center position,
the moving mechanism is configured to move, as the rack moves from the top dead center position to the bottom dead center position, the plate from the receiving position to a position that is away from the die apparatus in the conveying direction and is below the conveying surface, and
an outer peripheral surface of the pinion includes a toothed portion having teeth and a toothless portion that does not mesh with the rack as the rack moves between the bottom dead center position and the middle position, the middle position is between the top dead center position and the bottom dead center position.

2. The manufacturing apparatus according to claim 1, further comprising a coupling mechanism that couples the plate and the rack to each other, wherein
the middle position is defined as a first middle position,
the rack is configured to move to a second middle position,
the coupling mechanism is configured to move the plate integrally with the rack as the rack moves between the top dead center position and the second middle position and to prevent the plate from moving in the vertical direction as the rack moves between the second middle position and the bottom dead center position, and
the second middle position is identical with or below the first middle position.

3. The manufacturing apparatus according to claim 2, wherein
a direction that is orthogonal to both the conveying direction and the vertical direction is defined as a width direction,
the coupling mechanism includes:
a coupling member that is coupled to one end in the width direction of the plate and includes a hole that extends through the coupling member in the vertical direction; and
a coupling shaft that includes a shaft portion and a restriction portion, the shaft portion protruding downward from the rack and inserted into the hole, and the restriction portion restricting downward movement of the coupling member by contacting a lower surface of the coupling member,
the conveying device further including a restricting member, as the rack moves between the top dead center position and the second middle position, the restricting member is separated from the lower surface of the coupling member, and as the rack moves between the second middle position and the bottom dead center position, the restricting member contacts the lower surface of the coupling member to prevent the coupling member from moving downward, while allowing the rack to move downward.

4. The manufacturing apparatus according to claim 1, wherein the pinion is coupled to an engaging member, the engaging member including an arcuate outer peripheral surface that extends in a circumferential direction of the pinion, the rack includes a supporting member, the pinion is configured to move into a position in which the pinion does not mesh with the rack, and at the position in which the pinion does not mesh with the rack, the supporting member rotatably supports the engaging member while sliding on the outer peripheral surface of the engaging member, thereby preventing the rack from being displaced with respect to the pinion.

5. The manufacturing apparatus according to claim 4, wherein the supporting member includes an arcuate supporting surface, the arcuate supporting surface extending along the outer peripheral surface and rotatably supports the engaging member while sliding on the outer peripheral surface of the engaging member.

* * * * *